US 7,225,468 B2

(12) United States Patent
Waisman et al.

(10) Patent No.: US 7,225,468 B2
(45) Date of Patent: May 29, 2007

(54) METHODS AND APPARATUS FOR COMPUTER NETWORK SECURITY USING INTRUSION DETECTION AND PREVENTION

(75) Inventors: Nicolas Waisman, Buenos Aires (AR); Hector Augusto Paterno, Buenos Aires (AR); Cristian Leonardo Mata, Caseros (AR); Alejandro Raul Tamaroff, Capital Federal (AR)

(73) Assignee: Digital Security Networks, LLC, Wilmington, DE (US)

( * ) Notice: Subject to any disclaimer, the term of this patent is extended or adjusted under 35 U.S.C. 154(b) by 412 days.

(21) Appl. No.: 10/841,994

(22) Filed: May 7, 2004

(65) Prior Publication Data

US 2005/0262556 A1   Nov. 24, 2005

(51) Int. Cl.
*G06F 11/30* (2006.01)
*G06F 11/34* (2006.01)
*G06F 12/16* (2006.01)
*G06F 15/18* (2006.01)
*G06F 12/00* (2006.01)

(52) U.S. Cl. .......................... 726/23; 726/22; 726/25; 726/26; 713/151; 709/224; 709/227; 705/51

(58) Field of Classification Search ............ 726/22–26; 713/189, 151; 709/224, 227; 705/51
See application file for complete search history.

(56) References Cited

U.S. PATENT DOCUMENTS 6,003,133 A * 12/1999 Moughanni et al. ........... 726/4
7,124,438 B2 * 10/2006 Judge et al. ................. 726/22
2003/0084330 A1 * 5/2003 Tarquini et al. ............. 713/200
2003/0105976 A1 * 6/2003 Copeland, III .............. 713/201
2004/0054925 A1 * 3/2004 Etheridge et al. ........... 713/201
2004/0093513 A1 * 5/2004 Cantrell et al. ............. 713/201
2004/0098623 A1 * 5/2004 Scheidell .................... 713/201
2004/0111637 A1 * 6/2004 Baffes et al. ................ 713/201
2004/0221176 A1 * 11/2004 Cole .......................... 713/201
2005/0050351 A1 * 3/2005 Cain .......................... 713/201
2005/0097339 A1 * 5/2005 Wiley et al. ................ 713/188

* cited by examiner

*Primary Examiner*—Emmanuel L. Moise
*Assistant Examiner*—Minh Dieu Nguyen
(74) *Attorney, Agent, or Firm*—Buchanan, Ingersoll & Rooney PC (57) ABSTRACT

A method provides security to a computer network by selectively blocking network transmissions from selected IP addresses. The method includes the steps of: establishing a risk threshold whereby transmissions from IP addresses exceeding said risk threshold are selectively blocked; receiving a network transmission having an originating IP address and payload; analyzing the payload of said transmission and assigning a current risk rating to said IP address on the basis of said analysis; comparing the originating IP address of said transmission to a database of known IP addresses, each of said known IP addresses having a previous cumulative assigned risk rating, said previous cumulative assigned risk rating being based on at least one previous transmission from a known IP address; assigning a new cumulative risk rating to said originating IP address; logging the new cumulative risk rating for said originating IP address in said database of known IP addresses. The new cumulative risk rating is compared to said risk threshold and the transmission is blocked if said new cumulative risk rating exceeds said risk threshold.

42 Claims, 4 Drawing Sheets

METHODS AND APPARATUS FOR COMPUTER NETWORK SECURITY USING INTRUSION DETECTION AND PREVENTION

A portion of the disclosure recited in the specification contains material which is subject to copyright protection. This application includes a compact disc computer program listing appendix containing source code listings that list instructions for a method or apparatus by which the present invention may be practiced in a computer system. Two identical copies of the source code listing, volume name DSNREPL, comprising 99 files, 672,179 bytes, are provided on compact discs created on Sep. 24, 2004. The computer program listings on the compact discs are incorporated by reference. The copyright owner has no objection to the facsimile reproduction of the specification as filed in the Patent and Trademark Office. Otherwise all copyright rights are reserved.

FIELD OF THE INVENTION

The present invention relates to a method and apparatus for computer network security. More specifically, this invention relates to a computer network security system using intrusion detection and prevention system that blocks harmful transmissions automatically in real-time such that they are blocked without the need for human intervention by a computer network administrator.

BACKGROUND OF THE INVENTION

Today, computer hackers employ many techniques and methods to invade computer networks, including the use of worms, exploits, viruses, and trojans. For the last few years the primary solution to these types of attacks has been the use of a firewall, which can be programmed with rules to detect potentially harmful transmissions. Firewalls, however, have been insufficient to protect computer networks from attack because no matter the size or complexity of a firewall, certain computer channels must be left open for authorized users to access Internet resources such as email and the world-wide web.

Because Firewalls have been insufficient to protect computer networks, Intrusion Detection Systems (IDS) were developed to detect attacks and inform the administrator of such attacks. IDSs, however, have been equally ineffective in stopping intrusions before they occur, because like Firewalls, they require human intervention. IDSs do not stop intrusions, and continuing intrusions are not stopped until the Administrator acts to intervene.

It would therefore be desirable to provide methods and an apparatus for blocking harmful transmissions automatically in real-time without the need for human intervention by a computer network administrator. It would also be desirable to provide methods and an apparatus to block, in real-time, transmissions from computer IP addresses that are the source of harmful transmissions. It would further be desirable for such a method and apparatus to combine several different types of analyses to detect and block harmful transmissions. Additional desirable features include a risk threshold that is programmable and/or which may be updated remotely and/or automatically; a database of signatures of harmful transmissions that contains up-to-date information concerning harmful payloads which may be updated remotely or automatically; a firewall for blocking harmful transmissions from certain IP address when it is determined that an attack is being made from a certain IP address, which is also pre-trained to block certain harmful transmissions as well as transmissions from certain IP addresses; a timer on the firewall to clear the harmful IP addresses after a determined time period; a system that can be used with an existing firewall; a system that can be used in a number of different configurations within an existing network to provide different types of security, such as security from outside attacks, security from internal attacks, and security from attacks made to an external network that originates from within the internal network.

BRIEF SUMMARY OF THE INVENTION

There is therefore provided, in one embodiment of the present invention, a method for processing transmissions in a computer network that includes establishing a risk threshold whereby transmissions from originating IP addresses exceeding said threshold are selectively blocked; receiving a network transmission having an originating IP address and payload; analyzing the payload of said transmission and assigning a current risk rating to said originating IP address on the basis of said analysis; comparing the originating IP address of said transmission to a database of known IP addresses, each of said known IP addresses having a previous cumulative assigned risk rating, said previous cumulative assigned risk rating being based on at least one previous transmission from a known IP address; assigning a new cumulative risk rating to said originating IP address, said new cumulative risk rating being the sum of said current risk rating and said previous cumulative assigned risk rating for said IP address, with the proviso that where said originating IP address is not contained in said database of known IP addresses, the new cumulative risk rating will equal the current risk rating; logging the new cumulative risk rating associated for said originating IP address in said database of known IP addresses, with the proviso that where the originating IP address of said transmission is not contained in said database of known IP addresses, a new record is created for the originating IP address and said new cumulative risk rating in said database of known IP addresses; comparing said new cumulative risk rating to said risk threshold; and automatically blocking said transmission if said new cumulative risk rating exceeds said risk threshold.

This exemplary embodiment overcomes disadvantages of previous methods for providing computer network security and is able to automatically block harmful transmissions in real-time without human intervention.

Those skilled in the art will understand that some embodiments of the invention are implemented using software or firmware running in an apparatus with a suitable processor, communications ports, and memory. Accordingly, individual blocks in the block diagrams do not necessarily represent separate hardware or software components.

DETAILED DESCRIPTION OF THE INVENTION

Figure 1:
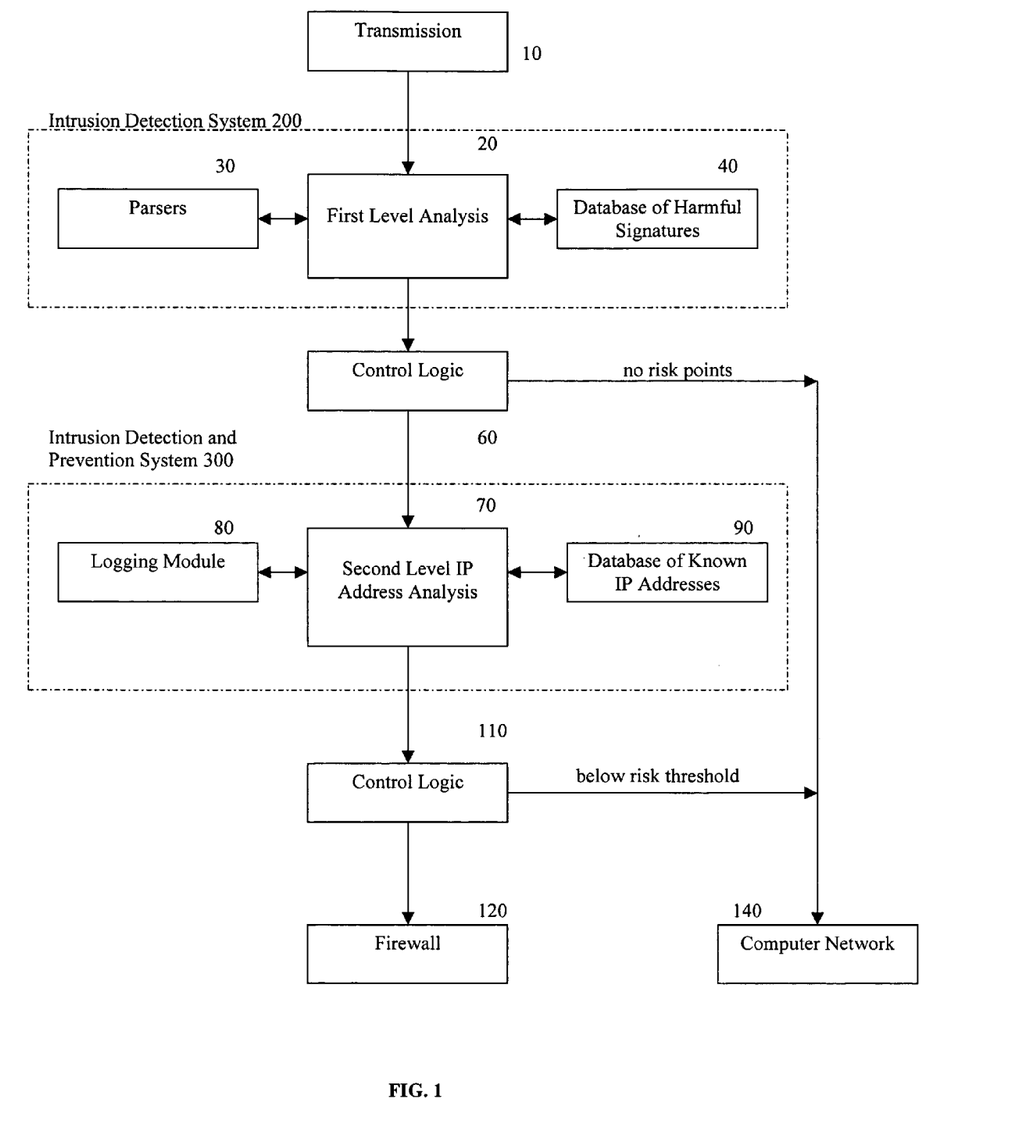
FIG. 1 is a block diagram of an embodiment of the intrusion detection and prevention system of the present invention.

In one embodiment of the present invention and referring to the block diagram of FIG. 1, an intrusion detection and prevention system is provided that combines a first level analysis 20, with a second level IP address analysis 70, and a firewall rule base 120 for automatically blocking harmful transmissions based on the second level IP address analysis 70.

The transmission 10 is a computer-based transmission from a computer network or the internet that is received by the system being protected. The transmission 10 enters the first level analysis 20, which can be performed by a suitable intrusion detection system (IDS) 200. In the embodiment illustrated in FIG. 1, the IDS 200 includes parsers 30 to interpret the individual packets that make up the payload of a single transmission. As is well-known in the art, the parsers reassemble the individual packets that make up the payload of a transmission, making it thereby possible to check the payload of an entire transmission 10 for harmful information rather than checking only individual packets.

Also included in the intrusion detection system of system 200 is a database of signatures of harmful transmissions 40, which includes information concerning harmful payload information that is associated with various types of attacks. For example, the database of signatures of harmful transmissions 40 can contain information concerning the signatures of payloads that are known to possibly represent buffer overflow attacks, stealth port scans, CGI attacks, SMB probes, OS fingerprinting attempts, viruses, trojans, exploits, or shellcode detections. In a preferred embodiment, the database of signatures of harmful transmissions 40 can also include a field that designates the number of risk points associated with each type of signature, if the signature is detected in the payload of a transmission.

In a preferred embodiment, the first level analysis 20 performs two types of recognition techniques to determine if the payload is potentially harmful: (1) signature analysis or misuse detection, and (2) correlation of lesser events.

To perform the signature analysis or misuse detection, the first level analysis 20 compares the payload of the transmission 10 to the database of signatures of harmful transmissions 40 to determine if the payload of the transmission 10 is similar to any of the signatures in the database of signatures of harmful transmissions 40. Specifically, the first level analysis 20 compares the data in the payload to substrings or known patterns of data stored within the database of signatures of harmful transmissions 40. If the first level analysis 20 locates a substring within the payload that matches one of the harmful signatures stored within the database of signatures of harmful transmissions 40, the transmission 10 is assigned a number of current risk points, the number depending on how much of a threat is posed by the transmission. The number of current risk points assigned to the transmission 10 may be determined by software within the system, based on an assessment of the relative risk posed by certain signatures. In the alternative, the number of current risk points assigned to the transmission 10 may be based on the risk level associated with the signature in the database of signatures of harmful transmissions 40. If the first level analysis 20 determines that the payload is not similar to one of the signatures, the transmission 10 is not assigned any current risk points.

The correlation of lesser events operates by recognizing a pattern or history of unusual transmissions from an originating IP address. For example, the payload of a transmissions may reflect that the transmission 10 is not in the standard format for that type of transmission, yet, the transmission 10 may not be similar to any of the signatures in the database of harmful signatures. In the alternative, the system can recognize if any aspect of the transmission 10 is abnormal or nonstandard. The correlation of lesser events recognizes that even if the payload is not similar to one of the signatures, it may nevertheless suggest that a transmission 10 is harmful. Accordingly, the first level analysis assigns a relatively low number of current risk points to transmissions that are not standard (which are added to any current risk points assigned by the signature analysis), yet which are not similar to any of the signatures in the database of harmful signatures. By assigning a non standard transmission a relatively low number of risk points, if enough unusual transmissions are received from the same originating IP address, the current risk points will accumulate.

Alternatively, the intrusion detection system 200 can perform other types of analyses, in addition to, or in place of, the signature analysis and misuse detection and correlation of lesser events analysis performed by the preferred embodiment, to determine if the payload of the transmission 10 is potentially harmful. For example, as is known in the art, the first level analysis 20 can be a heuristic or statistical anomaly analysis that is performed on payloads to determine if they harmful. The first level analysis can include only one form of analysis, or a combination of several types of analyses. Any type and combination of first level analysis 20 can be used by the invention provided that a method is included to assign risk points to the transmission 10 based upon the first level analysis 20. Where multiple types of first level analyses are used, a method to aggregate the risk points assigned by each type of analysis is also necessary. The intrusion detection system 200 as a whole could be a commercially available, open source, or custom-designed intrusion detection system, provided that a method is included to assign risk points to the transmission 10 based upon the first level analysis 20.

As is well-known in the art, hackers are constantly updating their intrusion techniques. Upon learning of the bugs in a system, the hackers can design a new intrusion technique to enable them to penetrate a system. In light of this, in a preferred embodiment, the database of harmful signatures is regularly updated so that it contains the most up-to-date information concerning the signatures of attacks being used by hackers. In one embodiment, the updates can be made by providing the user of the system a CD-ROM containing the updated information for the database of harmful signatures. In a preferred embodiment, and as is well-known in the art, the system can be designed so that updates can be transmitted to the database of harmful signatures via the internet, which allows the database to be updated in a more regular and timely fashion, and, perhaps, more often. In the preferred embodiment, updates can be made at any time, such as on a regular basis such as every day. In addition, under the preferred embodiment, the database of harmful signatures can be updated remotely in direct response to known threats, such as when a known email virus is propagating throughout the internet or when it is known that hackers are targeting specific types of networks.

After the transmission 10 is assigned current risk points, the control logic 60 determines whether additional processing is needed for the transmission. If the transmission 10 was assigned no current risk points after the first level of analysis, the transmission 10 is deemed not to require any additional processing, and the control logic 60 passes on the transmission 10 to the network 140 without additional processing. If the transmission 10 was assigned current risk points because the payload is similar to one of more of the signatures in the database of signatures of harmful transmissions 40 or if the correlation of lesser events analysis reveals that the transmission 10 is non-standard in any way, the control logic 60 passes the transmission 10 to the second level IP analysis 70 for additional processing.

A transmission 10 requiring additional processing is passed through to the second level IP analysis 70. In the embodiment illustrated in FIG. 1, the intrusion detection and prevention system 300 performs the second level IP analysis 70, and includes a logging module 80 and a database of known IP addresses 90.

When a transmission 10 enters the second level IP analysis 70, it is first sent to the logging module 80. The logging module 80 keeps a complete record of all transmissions that were assigned current risk points after the first level of analysis. In a preferred embodiment, the logging module 80 is a database that stores the IP Header, the TCP Header, and the payload for all transmissions that were assigned current risk points after the first level of analysis.

A preferred embodiment will also include an interface that will allow a system administrator to view all of the entries in the logging module 80, preferably through an easy-to-use graphical user interface. The graphical user interface can be located on an individual computer, such as a dedicated computer that is used to run the software that implements the method of the invention. In a preferred embodiment, the interface for viewing the entries in the logging module 80 is accessible via the internet using a standard web browser such as Microsoft Internet Explorer® or Netscape Navigator®. The preferred embodiment can be configured to permit multiple users such as different network administrators to monitor the activity of the Intrusion Detection System. In addition, because the preferred embodiment is accessed via a standard web browser, it can be configured to permit a network administrator remote access to the logging module 80 from any location that has access to the internet. Also in a preferred embodiment, the graphical user interface can be designed to provide graphic and/or text reports of the information stored in the logging module 80. Similarly, the graphical user interface can be an interface that is available anywhere on a local area network or wide area network.

The second level IP analysis 70 determines whether earlier risky transmissions were received from the same originating IP address as the current transmission 10. The second level IP analysis 70 performs this task by checking if the originating IP address of the current transmission 10 is in the database of known IP addresses 90. The database of known IP addresses 90 contains a list of all of the originating IP addresses of earlier transmissions that were assigned current risk points after the first level of analysis. The database of known IP addresses 90 also contains a running total of the previous cumulative risk points associated with the transmissions from each IP address.

If the originating IP address of the current transmission 10 is not listed in the database of known IP addresses 90, this indicates that earlier risky transmissions (i.e., transmissions that were assigned risk points in the first level analysis 20) were not received from the same IP address. If this is the case, a new record is created in the database of known IP addresses 90 for the originating IP address of the current transmission. That record includes the originating IP address of the current transmission, as well the cumulative risk points associated with the IP address. When a new record is created in the database of known IP addresses 90, the cumulative risk points associated with the originating IP address is equal to the current risk points that were assigned to the transmission 10 after the first level analysis 20.

If the originating IP address of the current transmission 10 is listed in the database of known IP addresses 90, this indicates that earlier risky transmissions (transmissions that were assigned one or more risk points) were received from the same originating IP address. If this is the case, the second level IP analysis 70 assigns a new cumulative risk rating to the IP address stored in the database of known IP addresses 90, the new cumulative risk rating being the sum of the current risk points and the previous cumulative risk points stored in the database.

After the database of known IP addresses 90 is updated, the new cumulative risk rating of the transmission 10 is compared to the pre-established threshold risk level. Preferably, the pre-established threshold risk level is set at a low enough level such that it will block harmful transmissions from a specific originating IP address without being too restrictive and blocking transmissions on the basis of too few risk points. For example, it would not be desirable for the threshold level to be set at such a low level that transmissions from originating IP addresses are being blocked after the network has received only a single transmission that was assigned a relatively low number of risk points. Accordingly, as will be understood by those in the art, the threshold level will be set at a level that takes into account the range of risk points that may be assigned by the first level analysis. Furthermore, the threshold level may be set in accordance with testing performed to determine an appropriate level that would not be over-restrictive yet which would block harmful transmissions as necessary. In an alternative embodiment, the threshold risk level may be set manually by a user such as a network administrator, who can set the threshold risk level to an appropriate level for the network being protected. In another embodiment, the pre-established threshold level may be automatically updated remotely via the internet. In this embodiment, the threshold level may be remotely changed when it is known that there is a greater risk that harmful transmissions may be sent to the protected network, such as when a known email virus is propagating throughout the internet. Similarly, the threshold level may be remotely changed when it is known that hacker attacks are being targeted at specific types of users, such as government or financial institutions.

Control logic 110 determines whether the transmission 10 is allowed to pass on to the network or whether it is blocked and prevented from passing on to the network. If the new cumulative risk rating is lower or equal to the pre-established threshold level, control logic 110 allows the transmission 10 to pass on to the network 140. If the new cumulative risk rating is greater than the pre-established threshold, the control logic 110 passes on to the firewall 120 a new rule to block transmissions from the originating IP address of the current transmission 10. This automatically prevents, in real-time, the current transmission 10 from entering the network, without the need for action by a network administrator. In addition, this new rule prevents future transmissions from the same originating IP address from entering the network.

In another embodiment, the IDP 300 is designed to provide real-time notification that a transmission has been blocked and that all transmissions from a particular IP address are being blocked. Thus, the system is designed to send out a notification email if the control logic has determined that the cumulative risk rating of a transmission is higher than the pre-established threshold. The system can send the email to the network administrator, or alternatively the system can be designed to send email to any person with an email address. As will be understood by one skilled in the art, the system can be designed to send email via an internet connection or via a local network as appropriate.

In one embodiment, the firewall 120 is a firewall already existing within a user's network. This embodiment permits users to integrate their existing security devices with the method of the invention without having to purchase an additional firewall. In another embodiment, the firewall 120 is a firewall included as part of a turn-key apparatus that can be inserted into a network and which performs the method of the invention. In either embodiment, and as is well-known in the art, the firewall 120 can be pre-trained with rules to block certain types of harmful transmissions. The transmissions that firewalls can be pre-trained to recognize and block includes SYN Attacks, IP Spoofing Attacks, Filter IP Source Route Attacks, Port Scan Attacks, Land Attacks, Tear Drop Attacks, ICMP/UDP Flood Attacks, Ping of Death Attacks, IP Address Sweep Attacks, Default Packet Deny Attacks, WINNuke Attacks, SYN Fragments Attacks, ICMP Fragments Attacks, FIN with no ACK Attacks, No Flags in TCP Attacks, Large ICMP Attacks, SYN and Fin Bit Set Attacks, Buffer Overflows, Heap Overflows, Format Strings, and Denial of Service Attacks. Thus, the firewall 120 acts as yet another level of defense against intrusions.

As will be known by those skilled in the art, the firewall 120 can be placed in various locations within a user's computer network, yet still maintain the ability to block harmful transmissions in real-time. In a preferred embodiment, the firewall 120 is placed such that all new transmissions must first go through the firewall 120, before the transmissions are processed by the methods of the invention. This permits the firewall 120 to block the transmissions it is pre-trained to recognize as harmful, before those transmissions are further analyzed by the method of the invention. This is advantageous as it reduces the number of transmissions that have to be processed by the method of the invention. It is further advantageous to install the firewall 120 as a first-line defense to completely prevent known intrusions from entering the system. In another embodiment, the firewall 120 can be placed so that transmissions are processed by it after they are processed by the method of the invention. In yet another embodiment, the firewall 120 can be used strictly to block transmissions if the new cumulative risk rating is greater than the pre-established threshold, without performing any additional functions to protect the system.

In another embodiment, the firewall 120 has a timer which can clear new rules that were sent to the firewall to block transmissions from specific originating IP addresses, after a predetermined time interval. Accordingly, if the Intrusion Detection and Prevention System 300 determines that the new cumulative risk rating is greater than the pre-established threshold, and the control logic 110 passes on to the firewall 120 a new rule to block transmissions from a particular IP address, the timer on the firewall can be programmed to clear, after the passing of the predetermined time interval, the new rule that causes transmissions to be blocked from the IP address. This feature is desirable because it permits the IDP 300 to automatically prevent harmful transmissions from a particular originating IP address, yet also recognizes that attacks may have been launched from "hi-jacked" IP addresses that may otherwise be the IP addresses of useful internet locations. Accordingly, it is advantageous not to permanently block transmissions from such useful internet locations. In one embodiment, the predetermined time interval is set to a specified duration such as 24 hours. In a preferred embodiment, the predetermined time interval is user-programmable so that a user or network administrator can specify the time interval used by the timer.

The methods of the invention can be implemented through software and/or firmware on a personal computer or a network that has an appropriate processing unit, memory, and communications ports. In a preferred embodiment the methods are implemented on a system that has internet access, which will permit the system to be designed with the preferred embodiments of updating via the internet, providing the administrator or other user notification of harmful attacks, and providing an interface that is accessible via the use of a web browser.

The methods can also be implemented in a turn-key apparatus that includes all the methods of the invention. As is known in the art, such an apparatus will have a suitable processor, memory, communications ports, and software and/or firmware to allow it to perform the methods of the invention and communicate with the network it is designed to protect. In addition, in a preferred embodiment the apparatus will have enough memory and processing power such that it will not use the resources of the server on the network the apparatus is designed to protect. Another advantage of the preferred embodiment is that it will be able to protect the network even when the network itself is experiencing difficulties, because in the preferred embodiment the method of the invention is not dependent on the resources and operating system of the network it is trying to protect.

Alternatively, in another embodiment the method of the invention can be implemented in an apparatus that performs all of the methods of the invention except the firewall. Such an apparatus will be preferred by those users who already have a firewall in their system, as many users currently do, and will include a processor, memory, communications ports, and software and/or firmware to allow it to perform the methods of the invention and communicate with the network it is designed to protect. In this embodiment the software in the apparatus is adapted to send an appropriate rule to the existing firewall to block transmissions from a particular originating IP address, when the cumulative risk level exceeds the pre-determined threshold.

Figure 2:
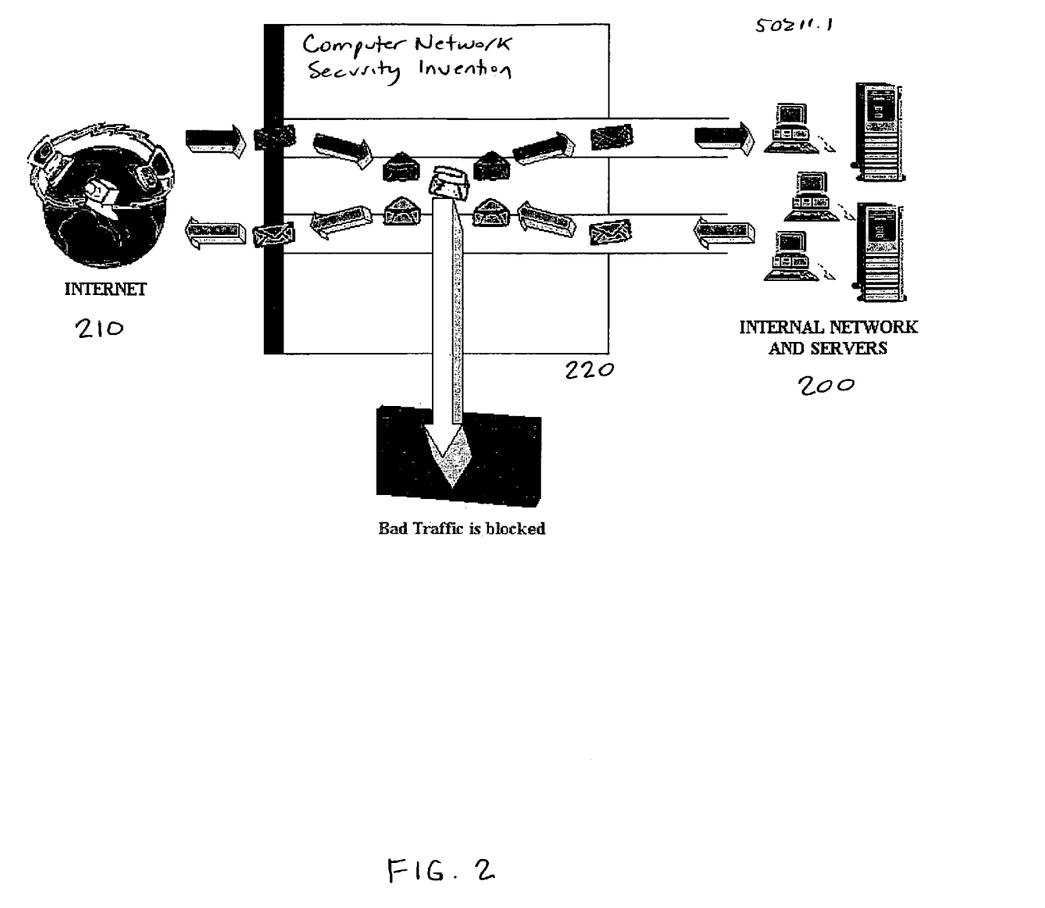
FIG. 2 is one embodiment of the intrusion detection and prevention system of the invention within an existing network that is connected to the internet.
Figure 3:
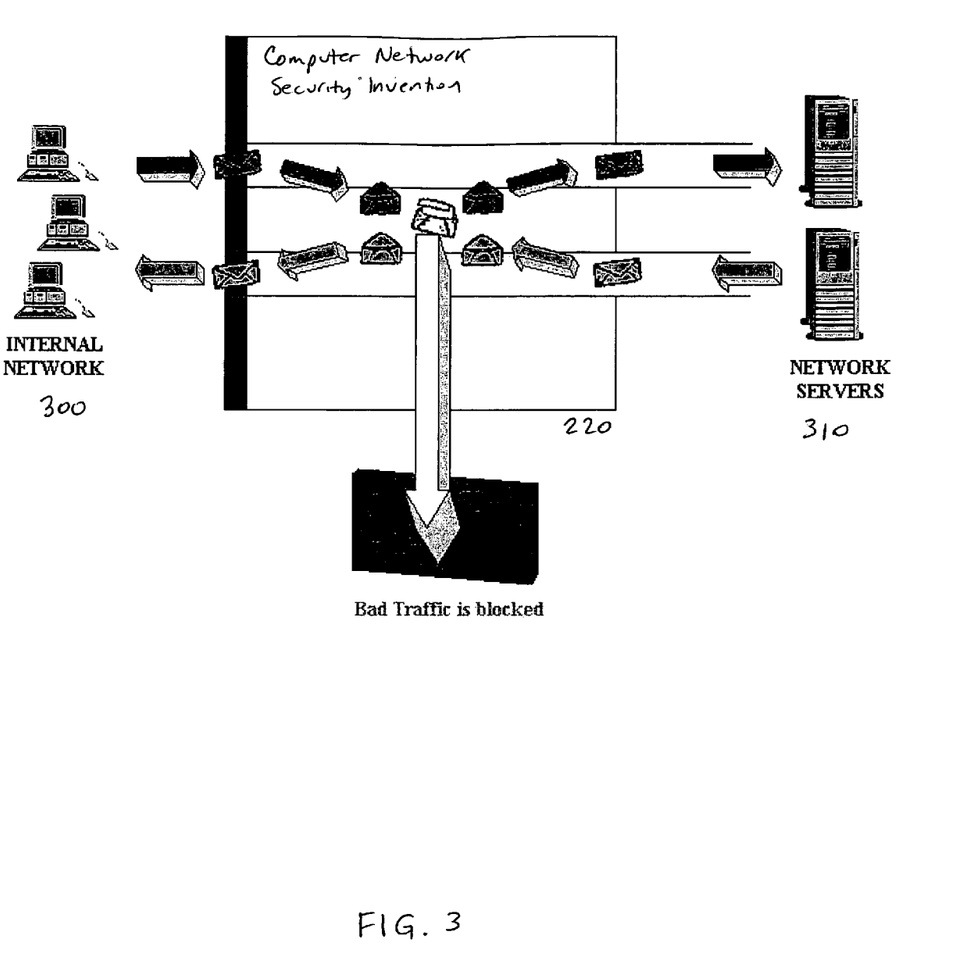
FIG. 3 is another embodiment of the intrusion detection and prevention system of the invention within an existing network that is connected to the internet.
Figure 4:
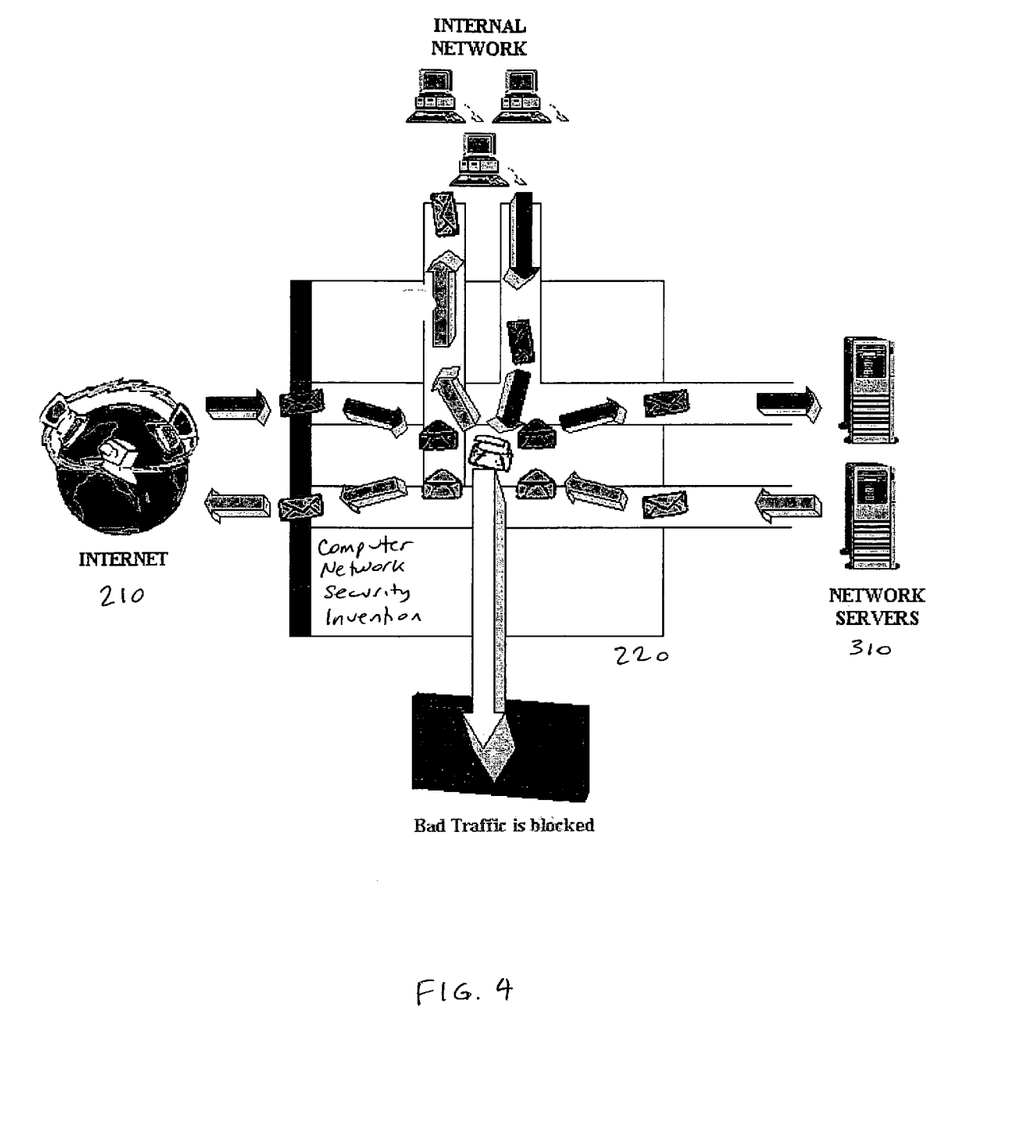
FIG. 4 is one embodiment of the intrusion detection and prevention system of the invention within an existing network with an internal network and network servers.

As is known by those in the art, the methods and/or apparatus of the invention can be placed in various locations within an existing network to provide different types of protection. For example, as shown in FIG. 2, the methods and/or apparatus 220 can be placed between an internal network and the network's servers 200, and the internet 210, such that they protect the existing network and the network servers from harmful transmissions originating from outside of the existing system, such as those from the internet, that may be potentially harmful. This configuration can also prevent harmful transmissions originating within the existing network from being transmitted through the internet. Alternatively, as shown in FIG. 3, the methods and/or apparatus 220 can be placed in between an internal network 300 and the network servers 310, such that they prevent harmful transmissions that originate within the existing internal network from reaching the network servers. Such a system could prevent malicious transmissions made by employees from entering other parts of a company's network. In another embodiment, as shown in FIG. 4, the methods and/or apparatus 220 can be placed between a network 300, the network servers 310, and the internet 210.

In this configuration, the methods and/or apparatus of the invention can protect the network and servers from harmful transmissions originating from outside of the existing network. In addition, in this configuration the methods and/or apparatus can protect the network servers from harmful transmissions that originate within the existing internal network. As will be understood by those skilled in the art, FIGS. 2–4 represent only several of the possible configurations in which the methods and/or apparatus of the invention may be used.

Thus, it will be seen that the embodiments of the present invention provide an intrusion detection and prevention system that blocks harmful transmissions automatically in real-time such that they are blocked without the need for human intervention by a computer network administrator. Several types of analysis of incoming data are provided, and method of the invention provides the ability to block transmissions originating from harmful LP addresses based on those analyses.

Although the invention has been described in terms of various specific embodiments, those skilled in the art will recognize that the invention can be practiced with modification within the spirit and scope of the claims.

What is claimed is:

1. A method for providing security to a computer network by selectively blocking network transmissions from selected IP addresses comprising the steps of:
    establishing a risk threshold whereby transmissions from IP addresses exceeding said risk threshold are selectively blocked;
    receiving a network transmission having an originating IP address and payload;
    analyzing the payload of said transmission and assigning a current risk rating to said IP address on the basis of said analysis;
    comparing the originating IP address of said transmission to a database of known IP addresses, each of said known IP addresses having a previous cumulative assigned risk rating, said previous cumulative assigned risk rating being based on at least one previous transmission from a known IP address;
    if the originating IP address is in the database of known IP addresses, then assigning a new cumulative risk rating to said originating IP address, said new cumulative risk rating being the sum of said current risk rating and said previous cumulative assigned risk rating for said originating IP address, otherwise, said new cumulative risk rating is set to equal said current risk rating;
    logging the new cumulative risk rating for said originating IP address in said database of known IP addresses, with the proviso that where said originating IP address of said transmission is not contained in said database of known IP addresses, a new record is created for said originating IP address and said new cumulative risk rating in said database of known IP addresses;
    comparing said new cumulative risk rating to said risk threshold; and
    automatically blocking said transmission if said new cumulative risk rating exceeds said risk threshold.

2. The method of claim 1 wherein said risk threshold is programmable to different risk levels.

3. The method of claim 1 wherein said risk threshold is updated automatically.

4. The method of claim 1 wherein analyzing the payload of a transmission comprises comparing said payload to known signatures of harmful transmissions.

5. The method of claim 4 wherein a predetermined risk rating is associated with each of said known signatures of harmful transmissions.

6. The method of claim 4 wherein said known signatures of harmful transmissions includes at least one member of the group consisting of Buffer Overflows signatures, Stealth Port Scans signatures, CGI Attack signatures, SMB Probe signatures, OS Fingerprinting Attempt Signatures, Computer Virus signatures, Trojan signatures, Exploits signatures, Shellcode Detection signatures, and Denial of Service Attack signatures.

7. The method of claim 4 wherein said known signatures of harmful transmissions are stored in a database of signatures of harmful transmissions.

8. The method of claim 7 where said database of signatures of harmful transmissions is updated automatically.

9. The method of claim 1 wherein analyzing the payload of a transmission comprises checking said payload for nonstandard features or abnormalities.

10. The method of claim 1 wherein assigning a current risk rating to said transmission comprises:
    allocating a fixed number of risk points greater than zero to said current risk rating based on said predetermined risk rating when the payload of said transmission is similar to at least one of said known signatures of harmful transmissions; and
    allocating zero risk points to said current risk rating when the payload of said transmission is not similar to any of said known signatures of harmful transmissions.

11. The method of claim 10 further comprising allowing said transmission to enter or leave said computer network without further processing if said current risk rating is zero risk points.

12. The method of claim 1 wherein assigning a current risk rating to said transmission comprises:
    allocating a fixed number of risk points greater than zero to said current risk rating when the payload of said transmission contains nonstandard features or abnormalities; and
    allocating zero risk points to said current risk rating when the payload of said transmission does not contain nonstandard features or abnormalities.

13. The method of claim 1 wherein automatically blocking said transmission comprises blocking said transmission using a firewall having rules to block transmissions.

14. The method of claim 13 wherein using a firewall having rules to block transmissions comprises sending said firewall a new rule to block transmissions from the originating IP address of said transmission if said new cumulative risk rating exceeds said predetermined risk threshold.

15. The method of claim 14, wherein said firewall has a timer to clear said new rule to block transmissions from the originating IP address of said transmission after a predetermined time interval.

16. The method of claim 15 wherein said timer is programmable to different predetermined time intervals.

17. The method of claim 13 wherein said rules to block transmissions includes at least one member of the group consisting of SYN Attacks, IP Spoofing Attacks, Filter IP Source Route Attacks, Port Scan Attacks, Land Attacks, Tear Drop Attacks, ICMP/UDP Flood Attacks, Ping of Death Attacks, IP Address Sweep Attacks, Default Packet Deny Attacks, WINNuke Attacks, SYN Fragments Attacks, ICMP Fragments Attacks, FIN with no ACK Attacks, No Flags in TCP Attacks, Large ICMP Attacks, SYN and Fin Bit Set Attacks, Buffer Overflows, Heap Overflows, Format Strings, and Denial of Service Attacks.

18. The method of claim 1 further comprising allowing said transmission to enter or leave said computer network if said new cumulative risk rating does not exceed said risk threshold.

19. The method of claim 1 wherein said transmissions are incoming to said computer network.

20. The method of claim 1 wherein said transmissions are outgoing from said computer network.

21. The computer network security apparatus of claim 20 further configured so that to analyze the payload of said transmission comprises checking said payload for nonstandard features or abnormalities.

22. The method of claim 1 wherein said transmissions originate within said computer network.

23. A computer network security apparatus for providing security to a computer network by selectively blocking network transmissions from selected IP addresses configured to:
   establish a risk threshold whereby transmissions from IP addresses exceeding said risk threshold are selectively blocked;
   receive a network transmission having an originating IP address and payload;
   analyze the payload of said transmission and assign a current risk rating to said IP address on the basis of said analysis;
   compare the originating IP address of said transmission to a database of known IP addresses, each of said known IP addresses having a previous cumulative assigned risk rating, said previous cumulative assigned risk rating being based on at least one previous transmission from a known IP address;
   if the originating IP address is in the database of known IP addresses, then assign a new cumulative risk rating to said originating IP address, said new cumulative risk rating being the sum of said current risk rating and said previous cumulative assigned risk rating for said originating IP address, otherwise, said new cumulative risk rating is set to equal said current risk rating;
   log the new cumulative risk rating for said originating IP address in said database of known IP addresses, with the proviso that where said originating IP address of said transmission is not contained in said database of known IP addresses, a new record is created for said originating IP address and said new cumulative risk rating in said database of known IP addresses;
   compare said new cumulative risk rating to said risk threshold; and
   automatically block said transmission if said new cumulative risk rating exceeds said risk threshold.

24. The computer network security apparatus of claim 23 further configured so that said risk threshold is programmable to different risk levels.

25. The computer network security apparatus of claim 23 further configured so that said risk threshold is updated automatically.

26. The computer network security apparatus of claim 23 further configured so that to analyze the payload of said transmission comprises comparing said payload to known signatures of harmful transmissions.

27. The computer network security apparatus of claim 26 further configured so that a predetermined risk rating is associated with each of said known signatures of harmful transmissions.

28. The computer network security apparatus of claim 26 further configured so that said known signatures of harmful transmissions includes at least one member of the group consisting of Buffer Overflows signatures, Stealth Port Scans signatures, CGI Attack signatures, SMB Probe signatures, OS Fingerprinting Attempt Signatures, Computer Virus signatures, Trojan signatures, Exploits signatures, Shellcode Detection signatures, and Denial of Service Attack signatures.

29. The computer network security apparatus of claim 26 further configured so that said known signatures of harmful transmissions are stored in a database of signatures of harmful transmissions.

30. The computer network security apparatus of claim 29 further configured so that said database of signatures of harmful transmissions is updated automatically.

31. The computer network security apparatus of claim 23 further configured so that to assign a current risk rating to said transmission comprises:
   allocating a fixed number of risk points greater than zero to said current risk rating based on said predetermined risk rating when the payload of said transmission is similar to at least one of said known signatures of harmful transmissions; and
   allocating zero risk points to said current risk rating when the payload of said transmission is not similar to any of said known signatures of harmful transmissions.

32. The computer network security apparatus of claim 31 further configured to allow said transmission to enter or leave said computer network without further processing if said current risk rating is zero risk points.

33. The computer network security apparatus of claim 23 further configured so that to assign a current risk rating to said transmission comprises:
   allocating a fixed number of risk points greater than zero to said current risk rating when the payload of said transmission contains nonstandard features or abnormalities; and
   allocating zero risk points to said current risk rating when the payload of said transmission does not contain nonstandard features or abnormalities.

34. The computer network security apparatus of claim 23 further configured so that to automatically block said transmission comprises blocking said transmission using a firewall having rules to block transmissions.

35. The computer network security apparatus of claim 34 further configured so that using a firewall having rules to block transmissions comprises sending said firewall a new rule to block transmissions from the originating IP address of said transmission if said new cumulative risk rating exceeds said predetermined risk threshold.

36. The computer network security apparatus of claim 35 further configured so that said firewall has a timer to clear said new rule to block transmissions from the originating IP address of said transmission after a predetermined time interval.

37. The computer network security apparatus of claim 36 further configured so that said timer is programmable to different predetermined time intervals.

38. The computer network security apparatus of claim 34 further configured so that said rules to block transmissions includes at least one member of the group consisting of SYN Attacks, IP Spoofing Attacks, Filter IP Source Route Attacks, Port Scan Attacks, Land Attacks, Tear Drop Attacks, ICMP/UDP Flood Attacks, Ping of Death Attacks, IP Address Sweep Attacks, Default Packet Deny Attacks, WINNuke Attacks, SYN Fragments Attacks, ICMP Fragments Attacks, FIN with no ACK Attacks, No Flags in TOP Attacks, Large ICMP Attacks, and SYN and Fin Bit Set Attacks.

39. The computer network security apparatus of claim 23 further configured to allow said transmission to enter or leave said computer network if said new cumulative risk rating does not exceed said risk threshold.

40. The computer network security apparatus of claim 23 wherein said transmissions are incoming to said computer network.

41. The computer network security apparatus of claim 23 wherein said transmissions are outgoing from said computer network.

42. The computer network security apparatus of claim 23 wherein said transmissions originate within said computer network.

* * * * *